United States Patent
Ma

(10) Patent No.: US 7,505,252 B2
(45) Date of Patent: Mar. 17, 2009

(54) NOTEBOOK COMPUTER

(75) Inventor: Mou-Ming Ma, Taipei County (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 476 days.

(21) Appl. No.: 11/297,332

(22) Filed: Dec. 9, 2005

(65) Prior Publication Data

US 2007/0133160 A1    Jun. 14, 2007

(51) Int. Cl.
*G06F 1/16*    (2006.01)
*H04M 1/00*    (2006.01)

(52) U.S. Cl. .................... 361/680; 455/556.1; 345/168; 400/693

(58) Field of Classification Search ......... 361/679–686, 361/724–727; 455/41.1–41.2, 556.1–557, 455/565
See application file for complete search history.

(56) References Cited

U.S. PATENT DOCUMENTS

| 6,504,529 | B1 | 1/2003 | Inagaki et al. | |
|---|---|---|---|---|
| 6,687,518 | B1 | 2/2004 | Park | |
| 2002/0128037 | A1* | 9/2002 | Schmidt | 455/553 |
| 2003/0021082 | A1 | 1/2003 | Lu et al. | |
| 2003/0021083 | A1 | 1/2003 | Landry et al. | |
| 2003/0100263 | A1 | 5/2003 | Tanaka et al. | |
| 2004/0075588 | A1 | 4/2004 | Wang et al. | |
| 2004/0190239 | A1 | 9/2004 | Weng et al. | |
| 2005/0035950 | A1* | 2/2005 | Daniels | 345/169 |
| 2006/0018089 | A1* | 1/2006 | Chou | 361/683 |

FOREIGN PATENT DOCUMENTS

| DE | 103 15 832 A1 | 11/2004 |
|---|---|---|
| JP | 10-93508 | 4/1998 |
| TW | M240633 U | 4/2003 |
| WO | WO-2005/006170 A2 | 1/2005 |

* cited by examiner

*Primary Examiner*—Jayprakash N Gandhi
*Assistant Examiner*—Nidhi Desai
(74) *Attorney, Agent, or Firm*—Birch, Stewart, Kolasch & Birch, LLP

(57) ABSTRACT

A notebook computer. The notebook computer includes a body, a keyboard, an infrared module, a wireless bluetooth module, and a control circuit. The keyboard is detachably disposed on the body. The infrared module and the wireless Bluetooth module are disposed on the body, and transfer a signal between the body and the keyboard. The control circuit detects a distance between the body and the detached keyboard. When the distance is less than a predetermined distance, the infrared module is used. When the distance is greater than the predetermined distance, the wireless bluetooth module is used.

5 Claims, 4 Drawing Sheets

10

NOTEBOOK COMPUTER

BACKGROUND

The invention relates to a notebook computer, and in particular, to a notebook computer with a detachable keyboard.

FIG. 1 is a conventional notebook computer 1, comprising a monitor 2 and a keyboard 3. The keyboard 3 is fixed on a main portion of the notebook computer 1. When the notebook computer 1 is used on a table, the keyboard 3 is disposed horizontally on the table. Thus, when the notebook computer 1 is used for a long time, the wrist of a user may be injured due to excessive extension thereof and the arm may also be injured. A user may also have stiff shoulders and a stiff neck. Additionally, the keyboard 3 cannot be removed from the notebook computer 1 when connecting to an external liquid crystal display.

SUMMARY

The invention provides a notebook computer with a detachable keyboard, which can utilize a control circuit to select suitable transfer modules.

Accordingly, a notebook computer with a detachable keyboard is provided. The notebook computer comprises a body, a keyboard, an infrared module, a wireless bluetooth module, and a control circuit. The keyboard is disposed on the body in a detachable manner. The infrared module and the wireless bluetooth module are disposed on the keyboard and are utilized to transfer a signal between the body and the detached keyboard. The control circuit is utilized to detect a distance between the body and the detached keyboard. When the distance is less than a predetermined distance, the infrared module is used. When the distance is greater than the predetermined distance, the wireless bluetooth module is used.

Furthermore, the keyboard further comprises a rechargeable battery and a connector plug. The connector plug is connected with the body and charges the rechargeable battery. The body further comprises an eject button utilized to detach the keyboard from the body.

DESCRIPTION OF THE DRAWINGS

The invention can be more fully understood by reading the subsequent detailed description and examples with references made to the accompanying drawings, wherein.

DETAILED DESCRIPTION

Figure 1:
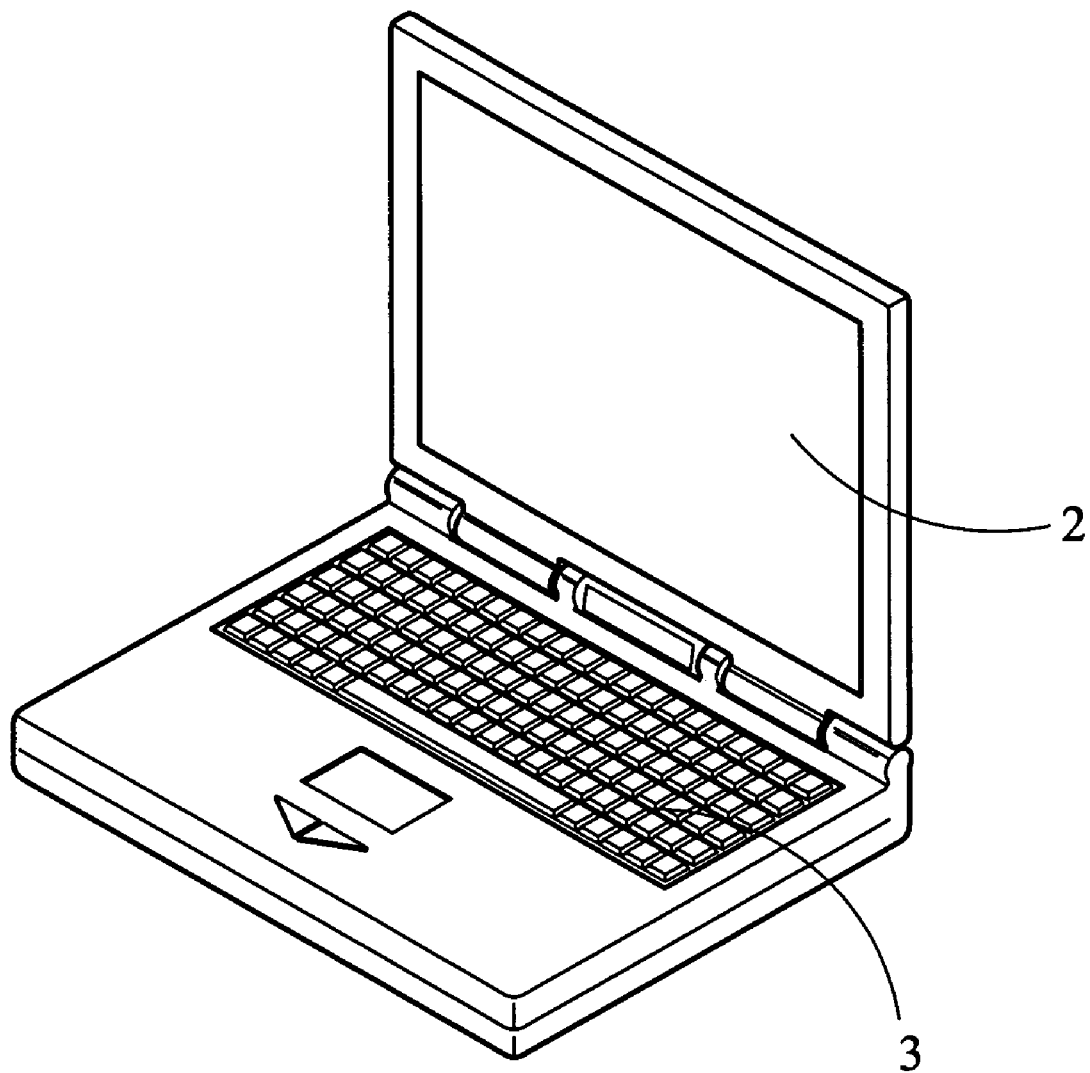
FIG. 1 is a schematic view of a conventional notebook computer.
Figure 2:
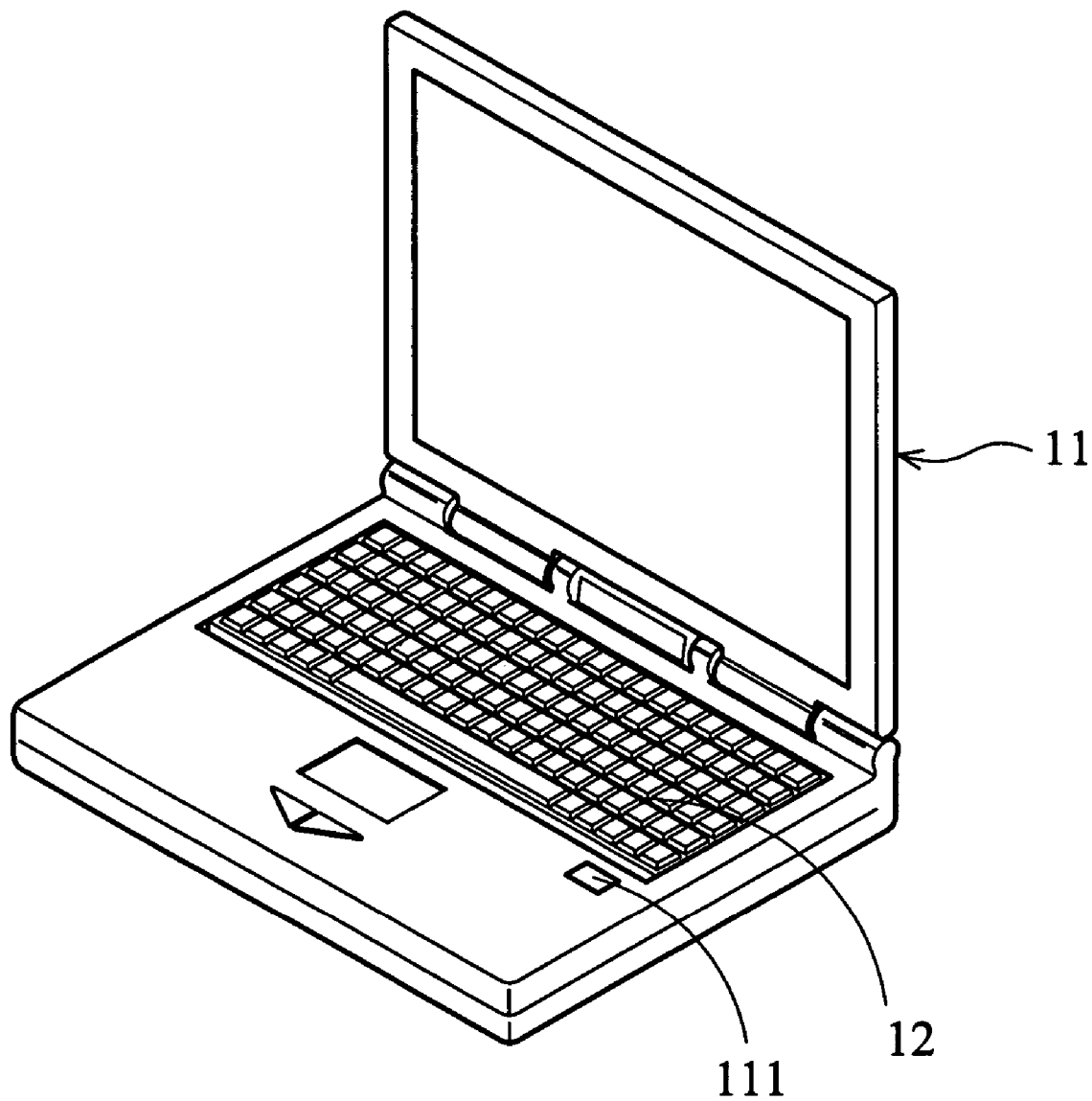
FIG. 2 is a schematic view of an embodiment of a notebook computer.
Figure 3:
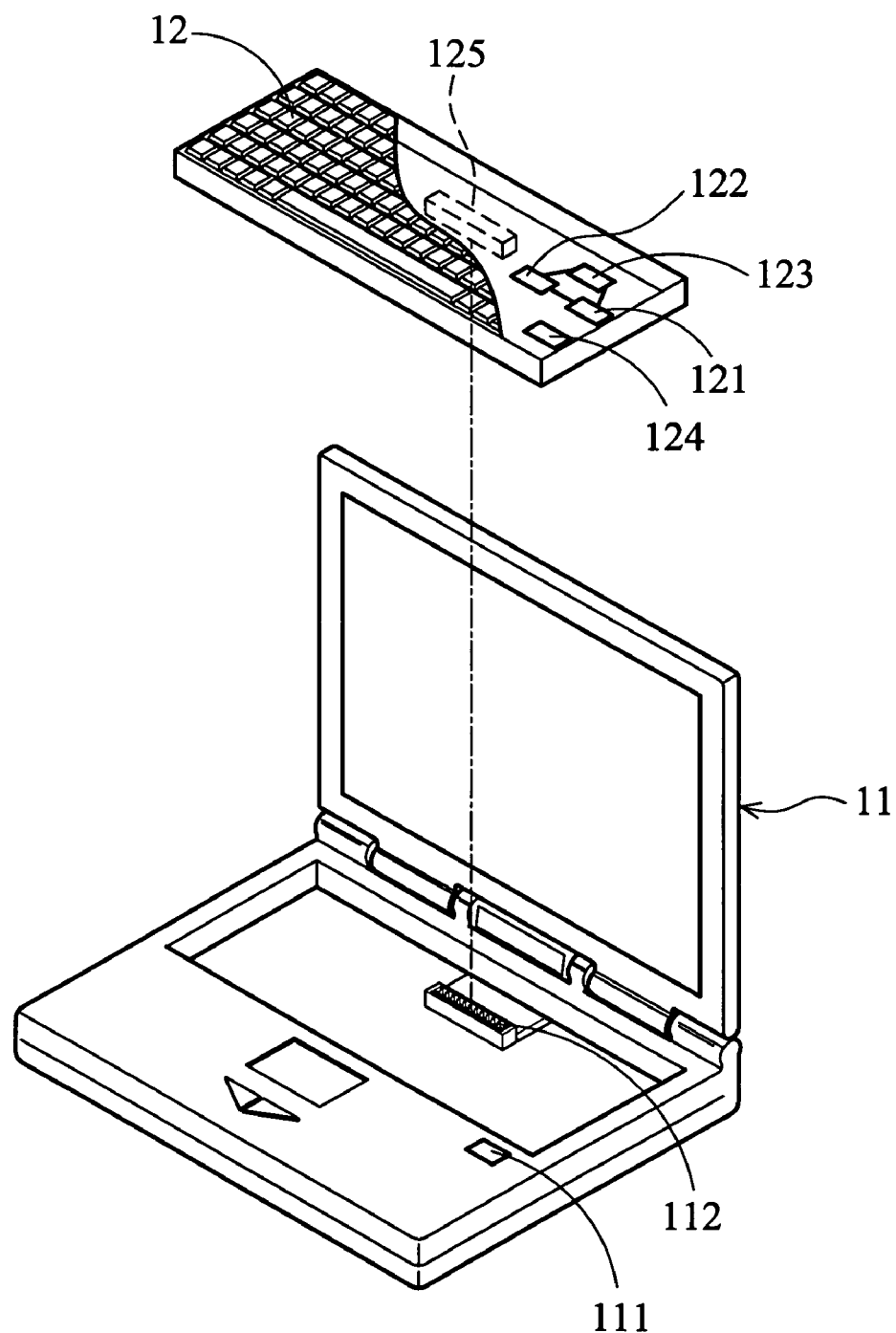
FIG. 3 is a schematic view of an embodiment of the notebook computer, wherein the keyboard is detached.

Referring to FIG. 2 and FIG. 3, a notebook computer 10 comprises a body 11, a keyboard 12, an infrared module 121, a wireless bluetooth module 122, and a control circuit 123. The keyboard 12 is disposed on the body 11 in a detachable manner. The infrared module 121, the wireless bluetooth module 122 and the control circuit 123 are all disposed on the keyboard 12.

The infrared module 121 and the wireless bluetooth module 122 are utilized to transfer a signal between the keyboard 12 and the body 11. The detached keyboard 12 is predetermined to use the infrared module 121. The control circuit 123 is utilized to detect a distance $d_1$ between the body 11 and the detached keyboard 12, and select the wireless bluetooth module 122 or the infrared module 121.

Referring to FIG. 3, the body 11 further comprises an eject button 111 and a groove 112. The keyboard 12 further comprises a rechargeable battery 124 and a connector plug 125. When the keyboard 12 disposed on the body 11 is used, the connector plug 125 is connected with the groove 112 of the body 11 and charges the rechargeable battery 124 of the keyboard 12. The eject button 111 can be pressed downward to detach the keyboard 12 from the body 11.

Figure 4:
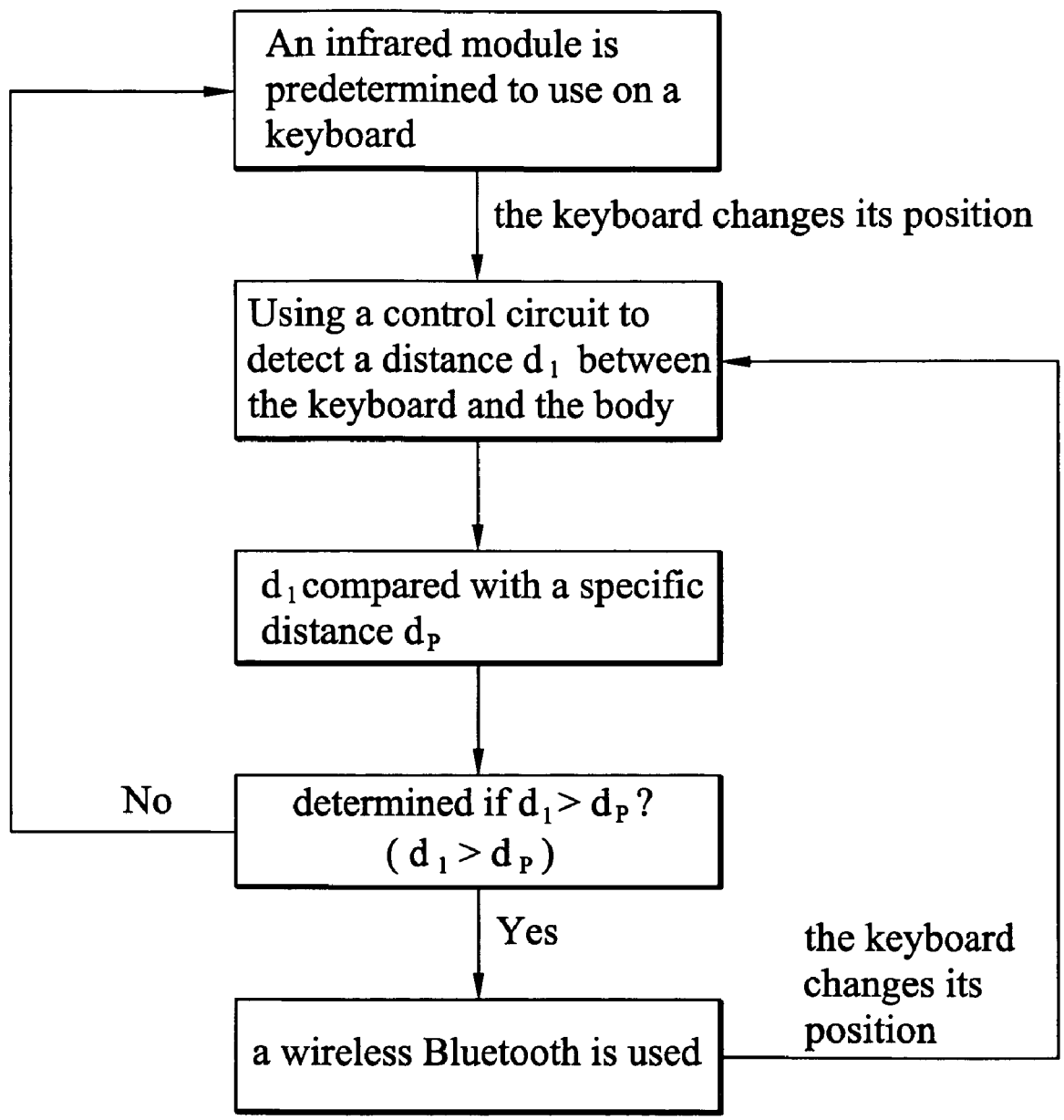
FIG. 4 is a flow chart of an embodiment of a control circuit of the notebook computer.

When the keyboard 12 is detached from the body 11, the control circuit 123 of the detached keyboard 12 can detect the distance $d_1$ between the body 11 and the detached keyboard 12. As shown in FIG. 4, when the distance $d_1$ is greater than the predetermined distance $d_p$, the detached keyboard 12 switches the infrared module 121 to the wireless bluetooth module 122 to transfer the signal. When the distance $d_1$ is shorter than a predetermined distance $d_p$, the detached keyboard 12 still uses the infrared module 121. When the detached keyboard 12 is moved again, the control circuit 123 again detects the distance $d_1$ and compares the distance $d_1$ with the predetermined distance $d_p$, to determine which transfer module will be used.

Note that some adjusting devices, such as a foot stand, are disposed on the keyboard 12 to ergonomically adjust the keyboard 12. The adjusting devices are well-known in the related art, thus, they are not described in detail here.

The detachable keyboard 12 and switch mode transfer modules are the main portion of the invention. The detachable keyboard 12 can be ergonomically adjusted and may reduce injuries to hands, neck, and shoulders. Furthermore, the detached keyboard 12 can be used farther from the body 11 (using the wireless bluetooth module 122 to transfer the signal). Additionally, when the detached keyboard 12 is closer to the body 11, the transfer module is switched back to the power-saving infrared module 121. Thus, the power consumption of the notebook computer 10 is reduced, and use of the notebook computer 10 is more convenient.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A notebook computer, comprising:
    a body;
    a keyboard disposed on the body in a detachable manner;
    an infrared module disposed on the keyboard, transferring a signal between the body and the keyboard;
    a wireless bluetooth module disposed on the keyboard, transferring the signal between the body and the keyboard; and
    a control circuit detecting a distance between the body and the detached keyboard, wherein when the distance is shorter than a predetermined distance, the infrared module is used; when the distance is longer than the predetermined distance, the wireless bluetooth module is used.

2. The notebook computer as claimed in claim 1, wherein the keyboard comprises a rechargeable battery.

3. The notebook computer as claimed in claim 2, wherein the keyboard further comprises a connector plug for connecting with the body and charging the rechargeable battery.

4. The notebook computer as claimed in claim 1, wherein the body comprises an eject button utilized to detach the keyboard and the body.

5. The notebook computer as claimed in claim 1, wherein the control circuit is disposed on the keyboard.

* * * * *